Figure 1:
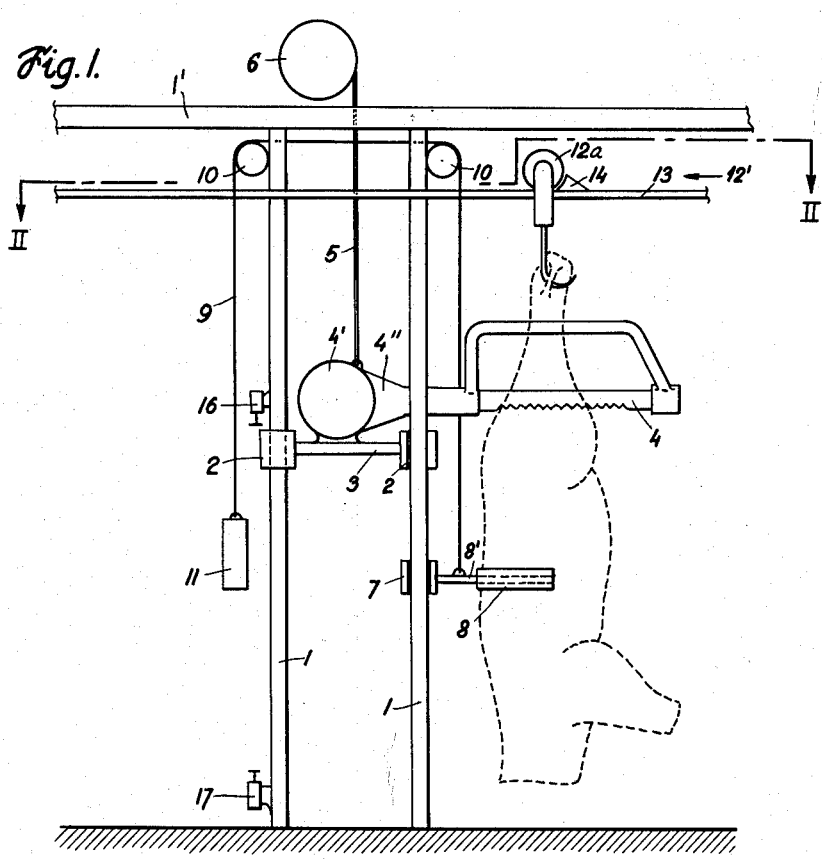

July 2, 1963

A. KÖTTNER 3,095,602

DEVICE FOR HALVING THE BODIES OF SLAUGHTERED ANIMALS

Filed Feb. 3, 1961

INVENTOR.
Antonín Köttner
BY

United States Patent Office 3,095,602
Patented July 2, 1963

3,095,602
DEVICE FOR HALVING THE BODIES OF SLAUGHTERED ANIMALS
Antonín Köttner, Hybesova 42, Slapanice, near Brno, Czechoslovakia
Filed Feb. 3, 1961, Ser. No. 86,974
Claims priority, application Czechoslovakia Feb. 19, 1960
1 Claim. (Cl. 17—23)

My invention relates to a device for use in slaughter houses and more specifically to a device for halving the bodies of slaughtered animals such as cattle, pigs and the like.

Such halving has been effected up to the present time by hewing the animal body with a hatchet or by manually cutting the same with a hand saw or an electrically driven saw. Such work required considerable physical effort and was very inefficient and thus unsuitable for modern production methods.

The object of my invention is to avoid the said and other disadvantages and to provide the slaughter industry with a device which operates automatically, swiftly and reliably.

The object of my invention will be fully understood from the following specification when read with the accompanying drawing in which an embodiment of my new device is illustrated.

In the drawing

FIG. 1 shows schematically an elevational view of my device, and

Figure 2:
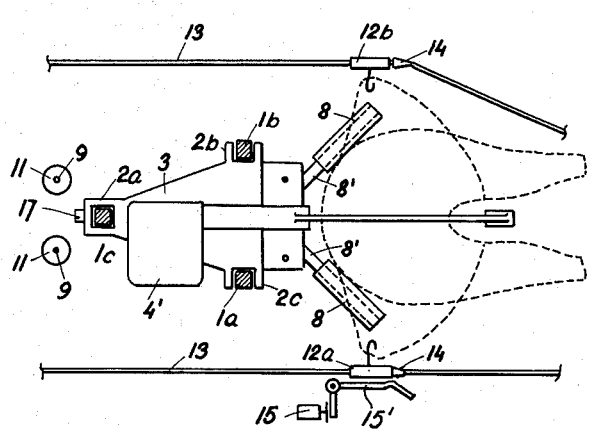

FIG. 2 a cross-sectional view taken along line II—II in FIG. 1.

My devices comprise a saw 4 operating in substantially horizontal direction and actuated by an electric motor 4' over a transmission encased in housing 4". This motor is attached to a base plate 3 which is provided with three slide guides 2a, 2b, 2c each of which glides upon a vertical guide post 1a, 1b, 1c, respectively between an uppermost and a lowermost position. The motor 4' with the saw 4 and the base plate 3 are suspended from a cable 5 which is wound upon a drum 6 rotatably mounted upon a supporting structure 1'. This drum is driven by an electric motor (not shown) preferably in such manner that the upward velocity of the motor-saw unit is greater than its downward velocity for example 20 feet per minute against 10 feet per minute.

The animal body to be halved (shown in dotted lines) is suspended by its hind legs from traveling supports such as running rollers 12a, 12b which approach the device on the rails 13 in the direction of arrow 12'. The rollers 12a, 12b in their shown end positions are held against a return movement by stop members 14.

When the rollers 12a, 12b reach their shown end positions the animal body contacts the stabilizing cylinders 8 which are rotatably mounted on arms 8' extending in V-formation from a sliding member 7 moving upon the two frontal guide posts 1a, 1b. Each of said arms 8' supporting the stabilizing cylinders 8 is connected to a balancing counter-weight 11 by a cable 9 which runs over the guide pulleys 10 mounted on the supporting structure 1'.

At the said time roller 12a actuates, for example as shown over the knee lever 15', the impact switch 15 switches in the saw motor 4' and the drum motor thereby initiating the operation of the saw 4 and the unwinding of cable 5 from drum 6. Now the operating saw 4 moves slowly downward and starts the halving operation. When the slide guides 2a, 2b on their downward movement reach the sliding member 7 the same is taken along and the stabilizing cylinders 8 mounted thereupon secure the proper position of the animal body relative to the saw 4 during its operation. When saw 4 has finished the halving operation and the slide guides 2a, 2b, 2c reach their lowermost position, slide guide 2c actuates an electric switch 17 which disconnects the saw motor 4' and reverses the motor driving the cable drum 6 so that the base plate 3 with the motorized saw 4 starts to move upward until said slide guide 2c reaches and actuates the circuit breaker 16 which switches off the motor driving the cable drum 6.

After the removal of the halved animal body another body to be halved is delivered to the device and operated upon as described above.

What I claim as my invention is:

A machine for halving bodies of slaughtered animals, such as cattle, pigs, or the like, suspended by their hind legs, comprising in combination (a) a cutting tool reciprocable in substantially horizontal direction and located to start its downwardly directed operation between said hind legs;

(b) an electric motor reciprocatively operating said cutting tool;

(c) a support for said electric motor mounted for reciprocable movement in vertical direction between an uppermost and lowermost position;

(d) vertical guide means for said support;

(e) reversible driving means effecting said reciprocable movement of the support;

(f) stabilizing means holding the suspended animal body in operating position relative to the cutting tool and slidingly mounted on said guide means to be pushed downwardly by the downwardly moving support during the halving operation;

(g) a pair of rails horizontally extending above the uppermost position of the cutting tool and parallel thereto, said rails spaced to support the hind legs of the animal body in spread position;

(h) suspending means movable on said rails holding the animal body by its hind legs;

(i) first electric switch means for the electric motor and for said reversible driving means, said switch means actuated by said suspending means in their rest position when holding the animal body in contact with said stabilizing means and causing the downward movement of said support for the electric motor and the operation of the cutting tool;

(j) a second electric switch means actuated by said support in its lowermost position to switch off the motor operating the saw and to reverse said driving means causing said support to move upward;

(k) and third electric switch means actuated by said support in its uppermost position to stop said driving means.

References Cited in the file of this patent
UNITED STATES PATENTS

| 1,165,389 | Clifford | Dec. 28, 1915 |
| 1,465,604 | Hunter | Aug. 21, 1923 |
| 2,634,457 | Moyer et al. | Apr. 14, 1953 |
| 2,789,310 | Soss | Apr. 23, 1957 |
| 2,904,826 | Hotard | Sept. 22, 1959 |